Aug. 11, 1953 — J. D. ROSIER ET AL — 2,648,514
ROTARY BOWL SUPPORT
Filed May 4, 1950

James D. Rosier
Mary L. S. Rosier
INVENTORS

Patented Aug. 11, 1953

2,648,514

UNITED STATES PATENT OFFICE 2,648,514

ROTARY BOWL SUPPORT

James D. Rosier and Mary L. S. Rosier, Montgomery, Ala.

Application May 4, 1950, Serial No. 160,010

2 Claims. (Cl. 248—131)

This invention relates to improvements in mixing and cooking utensils and relates specifically to an attachment which is adapted to be used in connection with a conventional mixing machine.

An object of this invention is to provide an attachment for a mixing machine which includes a receptacle divided into an upper liquid retaining chamber and a lower heating unit retaining chamber, together with a rotary turntable mounted in the upper chamber to support an ingredient bowl, whereby, through the action of the agitators of the mixing device, the bowl is rotated in the liquid in the upper chamber, which liquid is heated by the heating unit so that various icings, custards and other similar mixtures may be properly mixed and heated, as required by the various recipes.

It is another object of this invention to eliminate time required in cleansing two separate cooking utensils, that is, a mixer and double boiler, when the recipe requires that mixing and heat be applied to the icing, custard, or the like. This is accomplished by virtue of heating the bowl containing the ingredients while the ingredients are being mixed by the conventional agitator of the mixer.

Ancillary objects and features of importance will become apparent in following the description of the illustrated form of the invention.

Figure 1:
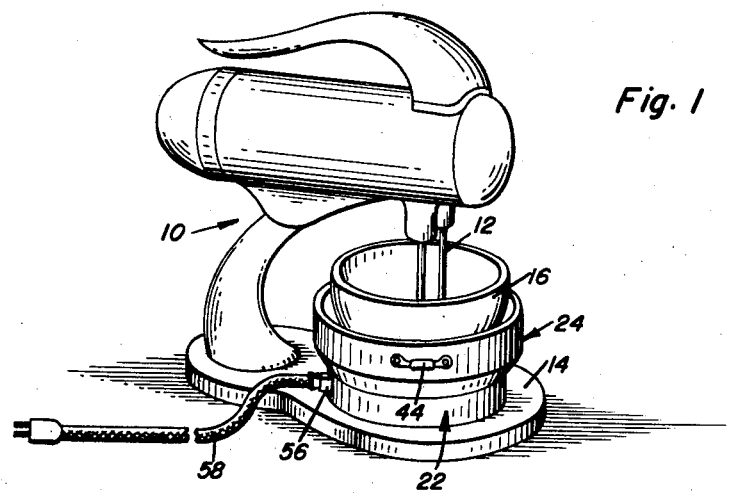
Figure 1 is a perspective view of the device showing it in combination with a conventional mixing machine or device.
Figure 2:
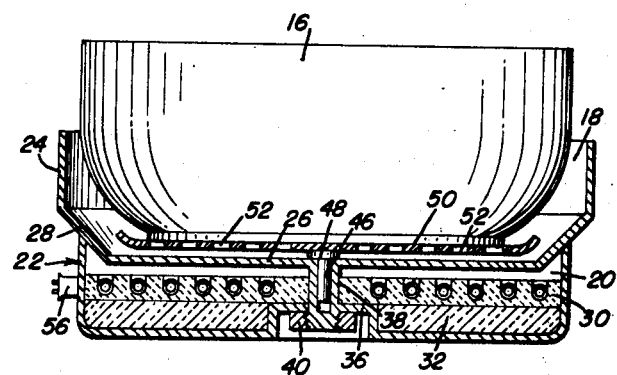
Figure 2 is a sectional view of the attachment with the mixing bowl shown in elevation.
Figure 3:
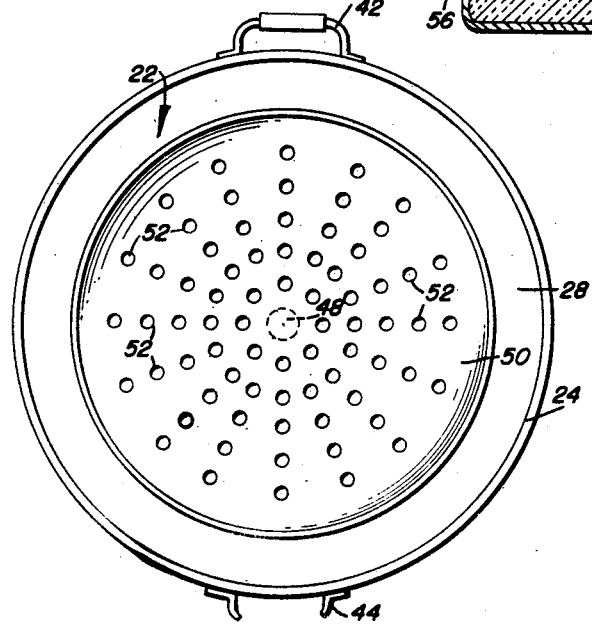
Figure 3 is a plan view of the device with the mixing bowl removed.

In the invention, there is a conventional mixing machine 10 of the type which includes one or more agitators 12 and a base or platform 14. The base includes a seat defined by the area over which the conventional mixing bowl 16 seats, usually on a rotary platform so that the mixing bowl is rotated in response to operation of the agitators 12.

Means forming an upper liquid chamber 18 and a lower heating unit chamber 20 is provided and consists of a housing 22 of a heat resistant non-corrosive alloy. Said housing includes a lower pan-shaped receptacle and an upper receptacle 24 of slightly larger diameter with a bottom 26 forming a horizontal partition, the bottom being connected with the side wall of the upper receptacle 24 by means of the inclined wall 28.

There is a heater or heating unit 30 disposed on the asbestos insulation sheet 32 within the chamber 20. A cup 36 is formed in the bottom of the lower receptacle and has a sleeve-type bearing 38 passed through the bottom thereof. This sleeve-type bearing is provided with a threaded element, as the nut 40 at one end which is disposed in the cup 36 to retain the lower receptacle assembled with the upper receptacle, these receptacles cooperating to form the main receptacle 22. Handles 42 and 44 are secured to the receptacle 22 so that the attachment may be moved easily from one place to another.

A spindle 46 is mounted for rotation in the bearing 38 and has a head 48 thereon and disposed in the chamber 18. Inasmuch as the bearing 38 opens into the chamber 18, the head 48 of the stud is mounted within said chamber 18 so that the turntable 50 which is fixed to said head 48 may be mounted within the chamber 18.

The turntable 50 is provided with a number of openings or apertures 52 so that the bottom of the bowl 16 may be exposed freely to the heated liquid within the chamber 18.

A plug 56 is secured to the side of the lower receptacle so that the cord 58 may be operatively connected therewith for supplying current to the heating unit 30.

In operation, the normal turntable of the conventional mixer is removed and the housing 22 disposed in the seat in the platform 14 or directly on the platform 14, depending on the type of mixer used. The removed turntable is then disposed in the chamber 18, the turntable element 50 and the element 46 being either the conventional one which is standard equipment with the mixer 10, or a special one, depending upon the prerogatives of the manufacturer of the device. The bowl 16, with the necessary ingredients, is then disposed on the turntable and the proper amount of water or other liquid placed in the chamber 18. The heating unit 30 is energized to thereby heat the liquid in the chamber 18. This, in turn, heats the contents of the bowl 16 while the bowl is being rotated as is usual through the action of and in response to the operation of the agitators 12.

We do not intend to be limited by the precise details of construction and arrangement of parts but regard our invention as including such changes and modifications as do not involve a departure from the spirit and scope of our claims.

Having described the invention, what is claimed as new is:

1. A cooker comprising a substantially panlike base including a bottom comprising a raised, apertured central portion, a removable receptacle including a substantially frusto-conical lower portion seated on the base, an externally threaded socket member depending from the bottom of the receptacle and extending through the raised central portion of the base bottom, a retaining nut threaded on said socket member, and a turntable removably mounted in the receptacle in spaced relation to the bottom thereof and including a headed depending stem journaled in the socket member.

2. A cooker comprising a base having an apertured central portion, a removable dish-like receptacle having an upwardly extending peripheral wall seated on said base and having a socket member depending therefrom extending into said apertured central portion, means positioned beneath said central portion engaging said socket member for detachably holding said receptacle to said base and a turntable removably mounted in said receptacle, said turntable having a stem rotatably seated in said socket member holding said turntable in spaced relationship relative to the bottom of said receptacle.

JAMES D. ROSIER.
MARY L. S. ROSIER.

References Cited in the file of this patent

UNITED STATES PATENTS

| Number | Name | Date |
|---|---|---|
| 1,722,221 | Hutchison | July 23, 1929 |
| 1,944,245 | Krause | Jan. 23, 1934 |
| 2,046,784 | Krause | July 7, 1936 |
| 2,275,901 | Harwood | Mar. 10, 1942 |

FOREIGN PATENTS

| Number | Country | Date |
|---|---|---|
| 215,539 | Great Britain | May 15, 1924 |
| 663,730 | France | Apr. 15, 1929 |